United States Patent [19]
Govindarajan et al.

[11] Patent Number: 6,006,234
[45] Date of Patent: Dec. 21, 1999

[54] LOGICAL GROUPINGS WITHIN A DATABASE

[75] Inventors: Rajagopalan Govindarajan, Fremont; Susan Kotsovolos, Belmont, both of Calif.; Ramkumar Krishnan, Nashua, N.H.; Joyo Wijaya, Menlo Park, Calif.

[73] Assignee: Oracle Corporation, Redwood Shores, Calif.

[21] Appl. No.: 08/962,531

[22] Filed: Oct. 31, 1997

[51] Int. Cl.[6] .................................................. G06F 17/30
[52] U.S. Cl. ................. 707/103; 707/3; 707/4; 707/10; 707/101; 707/104
[58] Field of Search ............. 707/3, 4, 10, 101, 707/102, 103, 104; 370/249; 709/303; 341/65

[56] References Cited

U.S. PATENT DOCUMENTS

| | | | |
|---|---|---|---|
| 5,608,720 | 3/1997 | Biegel | 370/249 |
| 5,754,841 | 5/1998 | Carino | 707/3 |
| 5,799,306 | 8/1998 | Sun | 707/10 |
| 5,799,309 | 8/1998 | Srinivasan | 707/102 |

*Primary Examiner*—Thomas G. Black
*Assistant Examiner*—Diane D. Mizrahi
*Attorney, Agent, or Firm*—McDermott, Will & Emery

[57] ABSTRACT

A method, system and computer-readable medium is provided for grouping database objects into logical groupings in order to simplify administrative and other operations that need to be performed by the database server. Such operations can be performed once at the logical group level for a group of related objects, as opposed to at the individual database object level. For increased flexibility, the logical groupings need not dictate the format, schema or location of their members. A hierarchy may be established between the logical groupings, where child groupings inherit some or all of the properties of the parent groupings. A correspondence may be established between some groupings and operating system directories, allowing identifiers associated with the groupings to be used as aliases for the full operating system paths to the corresponding directories.

25 Claims, 2 Drawing Sheets

LOGICAL GROUPINGS WITHIN A DATABASE

FIELD OF THE INVENTION

The present invention relates to database systems and, more specifically, to techniques for performing operations on database objects stored in databases.

BACKGROUND OF THE INVENTION

Within operating systems, files are typically stored in logical groups referred to as "directories" or "folders". While some computer programs require particular files to be stored in particular places to operate correctly, the decision about how to organize files within operating system directories is largely left to the user. For example, one user may create a single directory to store all computer games, while another user stores each computer game in a separate directory.

Unfortunately, database systems do not reflect the same flexibility with respect to grouping data items as operating systems do with respect to grouping files. Specifically, database systems typically support two types of logical groupings: the logical grouping of data items into data containers, and the logical grouping of data containers and other types of schema objects into schemas. In both cases, membership within the logical groupings is restricted by certain constraints. These constraints significantly limit the purposes for which the logical groupings can be used.

Specifically, the data container to which a data item belongs in a database dictates the format and content of the data item. Thus, data items that have similar characteristics are stored within the same logical containers. For example, in traditional relational database systems, the user data is stored in tables. Each row within a table has values for the same fields, where the fields are dictated by the columns of the table. Recently, database systems are moving toward the object-oriented paradigm, where data is stored as objects which belong to object classes. Each object class defines certain attributes, and all objects that belong to a given object class have values for the attributes defined by the object class. Some databases combine the relational and object-oriented database models by allowing objects, which belong to object classes, to be stored in tables.

Because the format of data items within a database is dictated by the logical container to which it belongs, data items cannot be freely moved among logical containers. For example, a row from an employee table that contains an employee name, address and phone number cannot be moved into a products table that has columns for an item number, brand and price.

Unlike logical containers, schemas typically do not dictate the format of their members. However, schema membership is tied to user identity. A schema is a collection of objects that are owned by a particular user. Schema objects are the logical structures that directly refer to the database's data. Schema objects include such structures as tables, views, sequences, stored procedures, synonyms, indexes, clusters, and database links. Because schema membership is tied to user identity, schemas do not provide useful groupings that are not tied to user identities.

The inflexibility of the logical groupings within a database can make certain tasks complex and inefficient. For example, consider a situation in which numerous companies store highly confidential information about employees in a single employee table, and about products in a single product table. Potentially, each of the companies would have data in each of the two tables that it does not want the other companies to be able to see. Under these conditions, it would be desirable to assign permissions to the data within the tables based on the company of the user that entered the information. However, because there is no correlation between the logical grouping of the data (i.e. the two tables) and the criteria upon which permissions are to be assigned, the task of assigning the permissions becomes difficult. A similar difficulty is encountered if the same set of permissions is to be assigned to a group of schema objects that do not belong to the same schema, or a subset of the schema objects within a single schema.

Based on the foregoing, it is clearly desirable to overcome the inflexibility inherent in the logical grouping mechanisms available in current database systems.

SUMMARY OF THE INVENTION

A method, system and computer-readable medium is provided for grouping database objects into logical groupings in order to simplify administrative and other operations that need to be performed by the database server. Such operations can be performed once at the logical group level for a group of related objects, as opposed to at the individual database level.

According to one aspect of the invention, the memberships of the logical groupings are not restricted by schema boundaries. Thus, a logical grouping may contain only a subset of the schema objects within a schema, or may contain schema objects that belong to different schemas. In addition, unlike schemas, the memberships of logical groupings may intersect.

For increased flexibility, the logical groupings need not dictate the format, schema or location of their members. A hierarchy may be established between the logical groupings, where child groupings inherit some or all of the properties of the parent groupings. A correspondence may be established between some groupings and operating system directories, allowing identifiers associated with the groupings to be used as aliases for the full operating system paths to the corresponding directories.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for supporting format-independent logical groups within a database is described. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
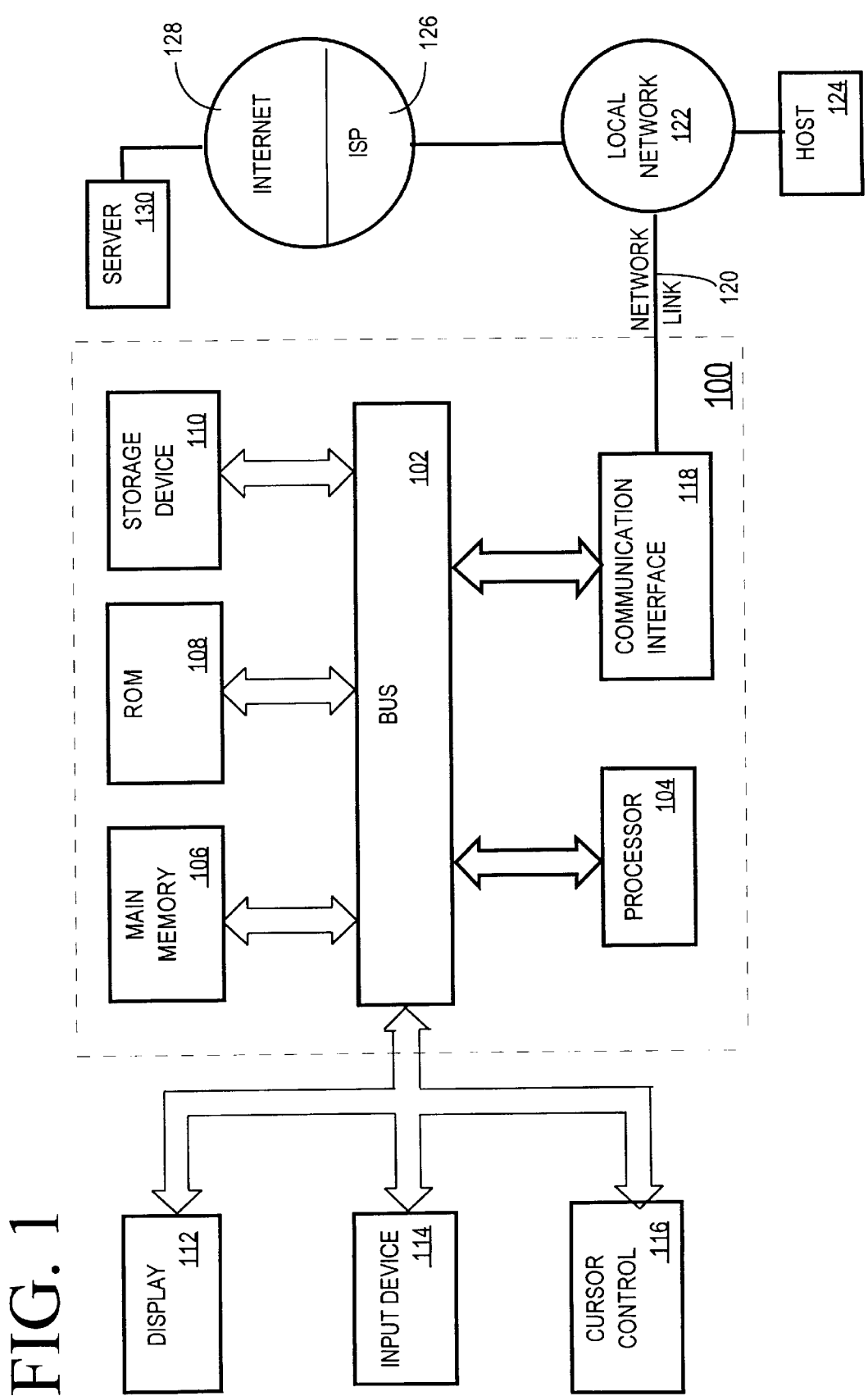
FIG. 1 is a block diagram illustrating a computer system on which embodiments of the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for providing format-independent logical groups within a database. According to one embodiment of the invention, format-independent logical groups are established by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Overview of Logical Groups

According to an embodiment of the invention, mechanisms are provided to support user-specified logical groups within a database. Unlike tables and object classes currently provided by database systems, the logical groups provided by the present invention do not impose a particular format on the members of the group. For example, a row from an employee table and a row from a product table may belong to the same group. Similarly, the members of a group may differ in granularity and substance. Thus, the same group may include an entire first table, a partition of a second table, a value from a column of a row in a third table, and a set of objects from one or more object classes.

Because membership in a group is not necessarily tied to any particular format requirements, users may create and establish the memberships of logical groups according to their own needs. No correlation need exist between the logical groups created by a user and the logical containers provided by the database system. Thus, a single logical group may have members from different tables, and a single table may include data items that belong to different logical groups.

Similarly, membership in a group is not necessarily tied to the identity of users. Therefore, membership of a single logical group may span multiple schemas. Similarly, a single schema can contain schema objects that belong to multiple logical groups.

Logical Group Creation

According to one embodiment, a logical group is created in response to user input received by the database system. The user input may, for example, take the form of a simple CREATE GROUP statement. Thus, a user may submit the statement "CREATE GROUP G1" to the database system to create a group with the name G1. In response to receiving this statement, the database system determines whether a group with the name G1 already exists. If a group with the name G1 already exists, then the database system generates an error message to indicate to the user that the name G1 is already taken. Otherwise, if a group with the name G1 does not already exist, the database system creates a group with the name G1.

Various mechanisms may be used to record in the database that a group G1 has been created. The mechanism used by a particular database will vary based on the data model used by the database. For example, a relational database may have a group table, where each row in the table contains data for a different group, and where one column of the table stores group names. On the other hand, an object-oriented database may contain a group class, where each object of the group class corresponds to a different group, and where the group class has a name attribute. For the purposes of explanation, the invention shall be described hereafter with reference to a relational database system that is able to store user-defined objects within tables. However, the present invention is not limited to any particular model of database system.

Within a relational database system, the database server responds to the CREATE GROUP G1 statement by searching a group table for a row that contains "G1" in the name column. If no row contains "G1" in the name column, then a new row is inserted into the group table that contains the name "G1". If a row already contains "G1", then an error is returned to the user.

Beyond the name or identifier of a logical group, various other information may be stored about each group. For example, a group table may include a memo column for storing descriptions of the group and a permissions column for storing data about who is allowed to access the members of the group.

Membership Assignment

According to one embodiment, membership in a logical group may be established at the time a database object is created, or at any time thereafter. As used herein, the term database object refers to any identifiable data item or set of data items within the database. Thus, database objects include but are not limited to tables, partitions, columns, rows, cells, indexes, object classes, objects, stored procedures, packages, hash tables and individual attributes.

At the time a database object is created, membership in a logical group is established by specifying a logical group name with the statement that creates the database object. The logical group name may be either an optional or a required parameter. For example, assume that a table named "myimagetable" has two columns. The first column stores an identification number ("id") and the second column stores an image. Assume further that the images are to be assigned to different logical groups. Such a table is created by the database system in response to the statement:

CREATE TABLE myimagetable (id NUMBER; image BFILE)

where BFILE indicates a large binary object (LOB) data type that is stored in operating system files external to the database itself.

Having thus created the myimagetable table, rows can be inserted into the table and, at the same time, images within the rows can be assigned to logical database groups with the following statements:

INSERT INTO myimagetable VALUES ((9, bfilename ('D1', 'image1')), (2, bfilename ('D1', 'image2')), (11, bfilename ('D2', 'image3')), (12, bfilename ('D2', 'image4')), (4, bfilename ('D2', 'image5')))

In this example, image1 and image2 are assigned to logical group D1, while image3, image4 and image5 are assigned to logical group D2.

Various mechanisms may be used to record within the database the members of a logical group. For example, a relational database may contain a group membership table, where each row within the group membership table has the form (gm, gn) where gm is an identifier for a group member and gn is a group name. Using this convention, the following entries would be added to the group membership table in response to the INSERT statement listed above:

(image1, D1)

(image2, D1)

(image3, D2)

(image4, D2)

(image5, D2)

The mechanism for recording the memberships of groups will vary from implementation to implementation. For example, an object-oriented database may define a member-list to be one attribute of a group-object. The member-list attribute of a given object would then store a list of identifiers that identify the members that have been assigned to a group associated with that particular group-object.

The above-example illustrates how database objects (i.e. the images) can be assigned to logical groups at the time they are created, that is, at the time they effectively become part of the database. According to the invention, database systems alternatively or additionally support commands for assigning a database object to a logical group after the database object has been created. For example, assume that an image "image6" was inserted into a row of myimagetable without being assigned a logical group. Image6 may be subsequently added to group D3, for example, by a statement such as: ADDMEMBER image6 TO D3.

Database Objects with Multiple Group Memberships

The logical groupings provided by the present invention may be used to implement various policies. For example, membership in each group may be established to enforce a permission policy. Thus, all data that may be accessed by users from Company A are added to group CA, all data that may be accessed by users from Company B are added to group CB, etc. In a system where groups have been established in this manner, the database system compares the company of a user against the group to which the data requested by a user belongs to determine whether the user may access the data.

In operating systems, any given file belongs to a single directory. In contrast, embodiments of the present invention allow database objects to simultaneously belong to multiple logical groups. In various applications, the ability of a database object to belong to multiple logical groups may allow functionality that would otherwise not be possible.

For example, assume that groups are used to enforce permissions, as described above. Within a company, different users have different access privileges. Some users, such as the CEO, should have access to virtually all of the company's information, and some users, such as a part-time receptionist, should have very limited access. Other users, such as vice presidents, managers and engineers, should have access to a specific subsets of the companies data. Under these circumstances, it would be possible to establish one logical group G1 for data that the CEO can access, and other logical groups G2, G3, G4, G5 for data that vice presidents, managers, engineers and receptionists can access, respectively. However, in this case the memberships of G2, G3, G4 and G5 may simply be subsets of the membership of G1. Therefore, any data to be seen by a receptionist is added as a member to G1, G2, G3, G4 and G5.

Hierarchical Groupings

In certain applications, it is desirable to establish relationships between logical groups. For example, assume that all employees of a company are to have access to the company directory. Using the technique described above, every database object inserted into the company directory would have to be added to five database groups, and every deletion from the company directory would have to be removed from five database groups. The overhead associated with these operations may be reduced by establishing relationships between logical groups.

For example, a database system that uses logical groups may allow users to specify parent/child relationships between the logical groups, and define the meaning of the parent/child relationships. In the permission-based groupings described above, the parent/child rule can be established to mean that permission to access members of a parent group implies permission to access members of a child group.

Based on this parent/child rule, G1 can be established as the parent of G2, G2 can be established to be the parent of G3, etc. These parent/child relationships can be recorded in the database, for example, by storing entries in the form of (PG, CG) into a parent-child table, where PG identifies a parent group and CG specifies a child group. Using this convention, the following entries may be stored in the parent-child table:

(G1, G2)
(G2, G3)
(G3, G4)
(G4, G5)

Once these relationships have been established, database objects are made available to different classes of users simply by adding the database objects to a single logical group. Thus, members added to G5 are available to anyone. Members added to G2 are available to vice presidents and the CEO. Members added to G1 are available only to the CEO.

Based on the specific problem to which logical groupings are applied, a database server may adopt a policy that all properties associated with a parent logical grouping are inherited by its child logical groupings. Such properties may include, for example, access privileges. Thus, all users granted access to members of G1 are automatically granted access to members of all descendents of G1.

According to one embodiment, inheritance of properties may be overridden in a child logical grouping on a property-by-property basis. For example, consider a situation in which logical groupings are associated with permissions and descendent groups inherit the permissions of the parents (unless the permissions are overridden). Assume further that company policy dictates that one class of employee (C1) is allowed to see tables T1–T30, another class of employee (C2) is allowed to see tables T1–T20, another class of employee (C3) is allowed to see tables T1–T10 and T21 through T30, another class of employee (C4) is allowed to see tables T11–T20, and another class of employee (C5) is allowed to see tables T21–T30.

Figure 2:
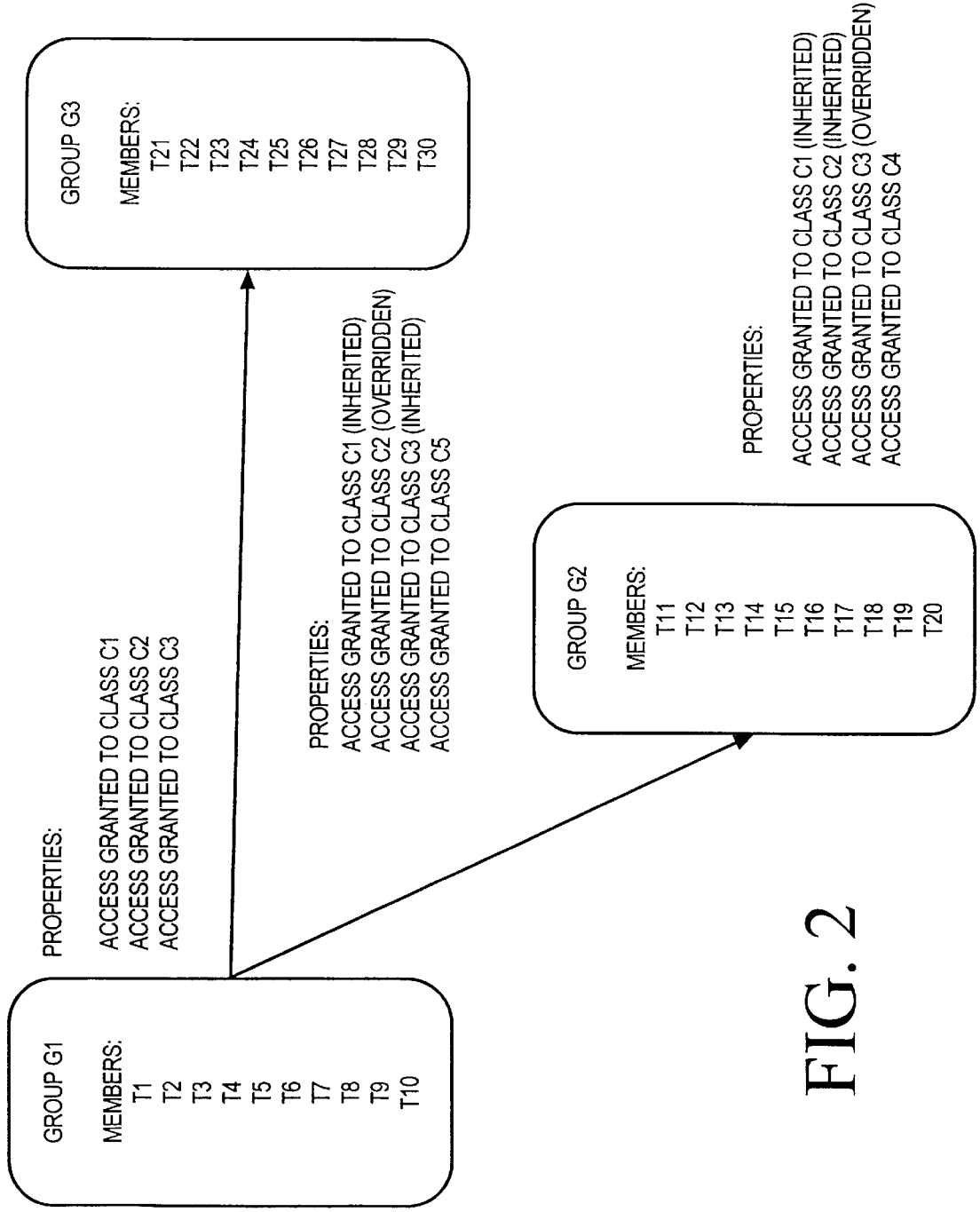
FIG. 2 is a block diagram illustrating a hierarchy of logical groupings according to an embodiment of the invention.

Using the ability to inherit and override permissions, the company policy described above may be established using three logical groupings G1, G2, G3 illustrated in FIG. 2. Tables T1–T10 are members of group G1. The properties of G1 grant access to classes C1, C2 and C3. Groups G2 and G3 are children of group G1 and therefore inherit the permissions associated with group G1. However, group G2 overrides the permission of class C3 and adds a permission to class C4. Similarly, group G3 overrides the permission of class C2 and adds a permission to class C5. The members of group G2 are T11–T20 and the members of group G3 are T21–T30.

In embodiments that support hierarchical groupings, the meaning of parent/child relationships may vary from implementation to implementation. In the previous examples, the significance of the parent/child relationship is that child groupings implicitly inherit the properties of parent groupings unless the properties are explicitly overridden. In alternative embodiments, the significance of the parent/child relationship may be, for example, that parent groupings implicitly include the membership of their children groupings. Alternatively, the parent/child relationship may signify that administrative operations performed on parent groupings are automatically performed on child groupings.

Non-Tree Hierarchies

Within operating systems, each directory is allowed to have one and only one parent directory. The structure thus created is generally referred to as a directed tree. According to one embodiment of the invention, the relationships between logical groupings do not have the one-parent limitation, and therefore are not be restricted to a directed tree. For example, assume that users from one department are allowed to see database objects that belong to group G1 but not group G2, and users from another department are allowed to see database objects that belong to group G2 but not group G1. Further assume that users from both departments are allowed to see database objects that belong to a third group G3.

Under these conditions, G1 should not be made the parent of G2, and G2 should be not be made the parent of G1. However, both G1 and G2 should have a parental relationship with G3. Such a relationship may be established, for example, by storing the entries (G1, G3) and (G2, G3) in the child-parent table.

Operating System Directory Aliasing

There need be no correlation between the actual location of a database object and the logical database grouping(s) to which it belongs. For example, a database object that is stored as an external file in one operating system directory can be a member of the same logical database grouping as another external file in a different operating system directory. Similarly, the database objects associated with files that reside in the same operating system directory may be members of different logical database groupings. However, embodiments of the invention allow users to establish correlations between logical groupings and operating system directories.

Specifically, according to one embodiment of the invention, a correlation may be established between logical database groupings and operating system directories. Once such a correlation has been established, the name of the logical database grouping may be used within the database as an alias of the operating system directory. In addition, storage of a file in the operating system directory that corresponds to a logical group automatically adds the file to the logical group, but does not necessarily establish the file as a member of any the database container.

When a correlation has been established between an operating system directory and a logical database grouping, the logical database grouping may be referred to as a "directory alias". According to one embodiment, directory aliases are used during the handling of large binary objects that are stored outside of the database itself ("external LOBs"). Specifically, directory aliases are established for the directories in which external LOBs are stored, and the external LOBs are subsequently accessed through use of the directory aliases.

Before performing an operation on an external LOB, the client must provide the full directory path to where the external LOB resides. However, full path names may be relatively long, and therefore cumbersome to repeatedly specify in API calls. Therefore, the user provides the alias in lieu of a full path name. Once an alias has been established, the user may use the alias to specify the path when the full path name would otherwise be required.

For example, assume that an external LOB is located in the directory c:\users\johnson\project1\testprogs\images. A client that plans to perform operations on the LOB may issue a command "CREATE DIRECTORY images AS c:\users\johnson\project1\testprogs\images". In response to this command, the database server stores data that establishes a correlation between the alias "images" and the path "c:\users\johnson\project1\testprogs\images". Once the mapping of the alias to the path has been established, the alias "images" may be used in all subsequent operations to identify the path of the external LOB.

In addition to reducing the amount of storage used by references to LOBs, directory aliases allow external LOBs to be moved without having to update all on-disk references to the moved LOBs. For example, if all of the employee pictures are moved from "c:\users\johnson\project1\testprogs\images" to "d:\mystuff\images", then the references associated with all of the pictures can be effectively updated by changing the mapping of the alias "images" from "c\:users\johnson\project1\testprogs\images" to "d :mystuff\images".

Data about a LOB, referred to as a LOB locator, may be used when performing operations on LOBs. LOB locators are described in detail in pending U.S. patent application Ser. No. 08/962,487, entitled "LOB LOCATORS" filed by Anil Nori and Susan Kotsovolos on Oct. 31, 1997, the contents of which are incorporated herein by reference.

According to one embodiment of the invention, a locator for an external LOB stores both the directory alias and the filename of the external LOB. This information, combined with the alias-to-directory mapping maintained by the database server, allows a database server to operate on external LOBs without having to repeatedly read data from the table to which the external LOB belongs.

For example, assume that pictures for all of the employees listed in an employee table are stored external to the database. A client may issue a "select" statement on the employee table to retrieve pictures for all employees with the last name of "Johnson". Rather than send the actual pictures to the client, the server generates dynamic external LOB locators for each employee named "Johnson". Each of the dynamic external LOB locators includes the data retrieved from an on-disk external LOB locator that is stored in the employee table.

Once the client has received the external LOB locators, the client may perform operations by making calls to the server's LOB API. To perform an operation on the picture of a particular Johnson, the client makes an API call which passes back to the server the locator for the external LOB at issue. The server retrieves the directory alias from the locator and inspects the alias-to-directory mapping to determine the directory in which the external LOB resides. The server also retrieves the filename from the locator. With the filename and the full directory, the server can access the external LOB through the operating system without having to once again access the employee table to which the external LOB belongs.

According to one embodiment of the invention, directory aliases are also used to enforce security. Specifically, the server maintains an alias-to-permissions mapping. Before performing an operation requested by a client on an external LOB, the server reads the alias from the locator received from the client and inspects the alias-to-permissions mapping to determine whether the client requesting the operation has permission to perform the requested operation. If the client does not have permission to perform the operation, then an error message is returned to the client.

Because external LOBs are stored outside of the database, they are subject to any security mechanisms provided by the operating system. For example, the operating system may establish directory access permissions on a user-by-user basis. For a database server to operate accurately with the external LOBs, the operating system security mechanism must grant the database server at least as much permission as the database server grants to any user with respect to any given directory. For example, if the alias-to-permission mapping grants a client read access to external LOBs in a particular directory, then the operating system must at least grant to the database server read access to that particular directory and to the files in that directory.

In alternative embodiments, some or all of the logical groupings may map to operating system directories, but may only include a subset of the files within the directory to which they map. Thus, both G1 and G2 may map to an operating system directory c:\sys\bin that contains three files F1, F2 and F3. But G1 may contain F1 but not F2 or F3, and G2 may contain F2 and F3 but not F1.

Application of Logical Groupings

Logical groupings may be established to solve numerous types of problems. Some of the applications for logical groupings have been described above. Such applications include privilege administration and directory aliasing. However, the present invention is not limited to those particular applications. The flexibility associated with logical groupings renders them a useful tool for numerous other applications.

For example, logical groupings may be used to distinguish between portions of a database that should be exported and portions of the database that should not be exported in a particular situation. Without the ability to form arbitrary logical groupings, exporting a particular subset of the database may require one or more complex statements that individually specify each database object (e.g. each table and index) that should be exported. In contrast, all database objects to be exported may be assigned to a particular logical group. Subsequently, any time that group must be exported, an export operation may be performed on all members of the group simply by specifying the logical group that should be exported.

Further, embodiments of the invention have been described in which members are added to a group on an object-per-object basis. However, in alternative embodiments, a user may define membership of a group by specifying a particular criteria. All database objects that satisfy the particular criteria are automatically added to the logical group. Such a criteria may specify, for example, that all indexes created by a particular user belong to group G1. Consequently, when the particular user creates an index, the index is automatically added to group G1.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for grouping database objects in a database, the method comprising the steps of:
   establishing within a database a plurality of logical groups whose memberships are not restricted by schema boundaries;
   receiving data that identifies one or more database objects, and
      a logical group, of said plurality of logical groups, to which said one or more database objects are to belong;
   in response to receiving said data, performing the steps of
      establishing said one or more database objects as members of said logical group, and
      storing data within said database to indicate that said one or more database objects are members of said logical group.

2. The method of claim 1 wherein said step of establishing said one or more database objects as members of said logical group includes establishing a subset of schema objects of a particular schema as members of said logical group.

3. The method of claim 1 wherein said step of establishing said one or more database objects as members of said logical group includes establishing schema objects from a plurality of schemas as members of said logical group.

4. The method of claim 1 wherein said step of establishing said one or more database objects as members of said logical group includes establishing at least one but not all of the data items within a schema object as a member of said logical group.

5. The method of claim 1 wherein:
   said step of receiving data includes the steps of
      receiving data that specifies a first database object that is stored outside said database in a first operating system directory; and
   receiving data that specifies a second database object that is stored outside said database in a second operating system directory that is different than said first operating system directory; and
   said step of establishing includes establishing both said first database object and said second database object as members of said logical group.

6. The method of claim 1 wherein:
   said step of receiving data includes the step of receiving data that specifies a first database object that is stored outside said database in a first operating system directory;
   said step of establishing includes establishing said first database object as a member of said logical group;
   the method further includes the steps of
   receiving data that identifies
      a second database object that is stored outside said database in said first operating system directory; and
      a second logical group; and
   establishing said second database object as a member of said second logical group.

7. The method of claim 1 further comprising the steps of:
   receiving a statement that specifies an operation and said logical group; and
   performing said operation on all members of said logical group.

8. The method of claim 1 further comprising the steps of:
   receiving data that identifies a second logical group of said plurality of logical groups;
   receiving data that specifies a relationship between said logical group and said second logical group; and
   storing data that indicates that said relationship exists between said logical group and said second logical group.

9. The method of claim 8 wherein:
   said relationship specifies that said logical group is a parent of said second logical group; and
   said logical group is considered to include all members of said second logical group in response to said logical group being a parent of said second logical group.

10. The method of claim 8 wherein said relationship causes said second logical group to inherit properties of said logical group.

11. The method of claim 10 wherein said second logical group overrides at least one property of said logical group.

12. The method of claim 1 further comprising the step of establishing a correlation between said logical group and an operating system directory.

13. The method of claim 12 further comprising the step of performing an operation on a database object that belongs to said logical group in response to a statement that uses an identifier of said logical group as an alias to identify said operating system directory as the location storing said database object.

14. The method of claim 8 wherein:

said relationship specifies that said logical group is a parent of said second logical group; and the method further comprises the step of establishing a third logical group as a second parent of said second logical group.

15. A computer-readable medium carrying one or more sequences of instructions for grouping database objects in a database, wherein execution of the one or more sequences of instructions by one or more processors causes the one or more processors to perform the steps of:

establishing, within said database, a plurality of logical groups whose memberships are not restricted by schema boundaries;

receiving data that identifies
one or more database objects, and
a logical group, of said plurality of logical groups, to which said one or more database objects are to belong;

in response to receiving said data, performing the steps of
establishing said one or more database objects as members of said logical group, and
storing data within said database to indicate that said one or more database objects are members of said logical group.

16. The computer-readable medium of claim 15 wherein:

said step of receiving data includes the steps of
receiving data that specifies a first database object that is stored outside said database in a first operating system directory; and
receiving data that specifies a second database object that is stored outside said database in a second operating system directory that is different than said first operating system directory; and said step of establishing includes establishing both said first database object and said second database object as members of said logical group.

17. The computer-readable medium of claim 15 wherein:

said step of receiving data includes the step of receiving data that specifies a first database object that is stored outside said database in a first operating system directory;

said step of establishing includes establishing said first database object as a member of said logical group;

the computer-readable medium further includes instructions for performing the steps of
receiving data that identifies
a second database object that is stored outside said database in said first operating system directory; and
a second logical group; and
establishing said second database object as a member of said second logical group.

18. The computer-readable medium of claim 15 further comprising instructions for performing the steps of:

receiving a statement that specifies an operation and said logical group; and performing said operation on all members of said logical group.

19. The computer-readable medium of claim 15 further comprising instructions for performing the steps of:

receiving data that identifies a second logical group;

receiving data that specifies a relationship between said logical group and said second logical group; and storing data that indicates that said relationship exists between said logical group and said second logical group.

20. The computer-readable medium of claim 19 wherein:

said relationship specifies that said logical group is a parent of said second logical group; and said logical group is considered to include all members of said second logical group in response to said logical group being a parent of said second logical group.

21. The computer-readable medium of claim 19 wherein said relationship causes said second logical group to inherit properties of said logical group.

22. The computer-readable medium of claim 21 wherein said second logical group overrides at least one property of said logical group.

23. The computer-readable medium of claim 15 further comprising instructions for performing the step of establishing a correlation between said logical group and an operating system directory.

24. The computer-readable medium of claim 23 further comprising instructions for performing an operation on a database object that belongs to said logical group in response to a statement that uses an identifier of said logical group as an alias to identify said operating system directory as the location storing said database object.

25. The computer-readable medium of claim 19 wherein:

said relationship specifies that said logical group is a parent of said second logical group; and the computer-readable medium further comprises instructions for performing the step of establishing a third logical group as a second parent of said second logical group.

* * * * *